(12) United States Patent
Lissack et al.

(10) Patent No.: US 8,417,723 B1
(45) Date of Patent: Apr. 9, 2013

(54) SYSTEM, METHOD AND COMPUTER PROGRAM PRODUCT FOR ENABLING ACCESS TO A RESOURCE OF A MULTI-TENANT ON-DEMAND DATABASE SERVICE UTILIZING A TOKEN

(75) Inventors: Ryan Lissack, San Francisco, CA (US); Robert Joseph Snell, San Francisco, CA (US); Robert Charles Fly, Moraga, CA (US)

(73) Assignee: salesforce.com, inc., San Francisco, CA (US)

( * ) Notice: Subject to any disclaimer, the term of this patent is extended or adjusted under 35 U.S.C. 154(b) by 306 days.

(21) Appl. No.: 12/557,413

(22) Filed: Sep. 10, 2009

Related U.S. Application Data

(60) Provisional application No. 61/096,556, filed on Sep. 12, 2008.

(51) Int. Cl.
  *G06F 17/30* (2006.01)
(52) U.S. Cl.
  USPC ........................................................ 707/781
(58) Field of Classification Search .................. 707/781, 707/782
  See application file for complete search history.

(56) References Cited

U.S. PATENT DOCUMENTS

| | | | |
|---|---|---|---|
| 6,122,631 A * | 9/2000 | Berbec et al. ......................... | 1/1 |
| 7,035,854 B2 * | 4/2006 | Hsiao et al. ........................... | 1/1 |
| 7,209,929 B2 | 4/2007 | Dominguez, Jr. et al. .... | 707/103 |
| 2003/0069902 A1 * | 4/2003 | Narang et al. ................ | 707/203 |
| 2003/0233404 A1 | 12/2003 | Hopkins ....................... | 709/203 |
| 2005/0065925 A1 | 3/2005 | Weissman et al. ................ | 707/4 |
| 2005/0223022 A1 | 10/2005 | Weissman et al. ........... | 707/102 |
| 2005/0283478 A1 | 12/2005 | Choi et al. ......................... | 707/9 |
| 2006/0206834 A1 | 9/2006 | Fisher et al. .................. | 715/777 |
| 2006/0259492 A1 * | 11/2006 | Jun et al. ........................... | 707/9 |
| 2008/0010243 A1 | 1/2008 | Weissman et al. ................ | 707/2 |
| 2009/0037828 A1 | 2/2009 | Waite et al. .................... | 715/760 |

OTHER PUBLICATIONS

U.S. Appl. No. 60/828,192, filed Oct. 4, 2006.

* cited by examiner

*Primary Examiner* — Thu-Nguyet Le
(74) *Attorney, Agent, or Firm* — Zilka-Kotab, PC

(57) ABSTRACT

In accordance with embodiments, there are provided mechanisms and methods for enabling access to a resource of a multi-tenant on-demand database service utilizing a token. These mechanisms and methods for enabling access to a resource of a multi-tenant on-demand database service utilizing a token can be utilized to prevent identification of a user attempting to access the resource, and thus unwanted use of the user's identity.

17 Claims, 6 Drawing Sheets

SYSTEM, METHOD AND COMPUTER PROGRAM PRODUCT FOR ENABLING ACCESS TO A RESOURCE OF A MULTI-TENANT ON-DEMAND DATABASE SERVICE UTILIZING A TOKEN

CLAIM OF PRIORITY

This application claims the benefit of U.S. Provisional Patent Application 61/096,556 entitled "Method for Providing Secure, Session-less Remote Execution in a Multi-tenant Environment," by Lissack et al., filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to resource accessibility, and more particularly to enabling access to resources.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users generally access resources in a manner whereby their identity is known. For example, a session cookie which identifies the user attempting to access the resource and in addition to credentials of the user is customarily utilized and many times even required for accessing the resource. Unfortunately, making the identity of a user known when the user is attempting to access a resource allows for unwanted use of the user's identity. In some instances, the unwanted use of the user's identity may include taking over the user's identify to perform malicious tasks, such as attacks including cross-site scripting attacks and cross-site request forgery attacks.

BRIEF SUMMARY

In accordance with embodiments, there are provided mechanisms and methods for enabling access to a resource of a multi-tenant on-demand database service utilizing a token. These mechanisms and methods for enabling access to a resource of a multi-tenant on-demand database service utilizing a token can be utilized to prevent identification of a user attempting to access the resource, and thus unwanted use of the user's identity.

In an embodiment and by way of example, a method is provided for enabling access to a resource of a multi-tenant on-demand database service utilizing a token. In use, a request to access a resource is received at a first domain of a multi-tenant on-demand database service from a user. Additionally, a unique token is created for storage in association with a tenant identifier of a tenant of the multi-tenant on-demand database service and information to be utilized for accessing the resource. Further, access to the resource is enabled utilizing the unique token, wherein the access to the resource is provided by redirecting the user to a second domain of the multi-tenant on-demand database service.

While the present invention is described with reference to an embodiment in which techniques enabling access to a resource of a multi-tenant on-demand database service utilizing a token are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for enabling access to a resource of a multi-tenant on-demand database service utilizing a token.

To date, a user's identity has generally been made known when the user is attempting to access a resource. Unfortunately, this enables the user's identity to be used for unwanted purposes (e.g. attacks, etc.) Thus, systems and methods are provided for enabling access to a resource of a multi-tenant on-demand database service utilizing a token such that identification of the user's identity may be prevented for avoiding potential unwanted use of the user's identity.

Next, mechanisms and methods for enabling access to a resource of a multi-tenant on-demand database service utilizing a token will be described with reference to exemplary embodiments.

Figure 1:
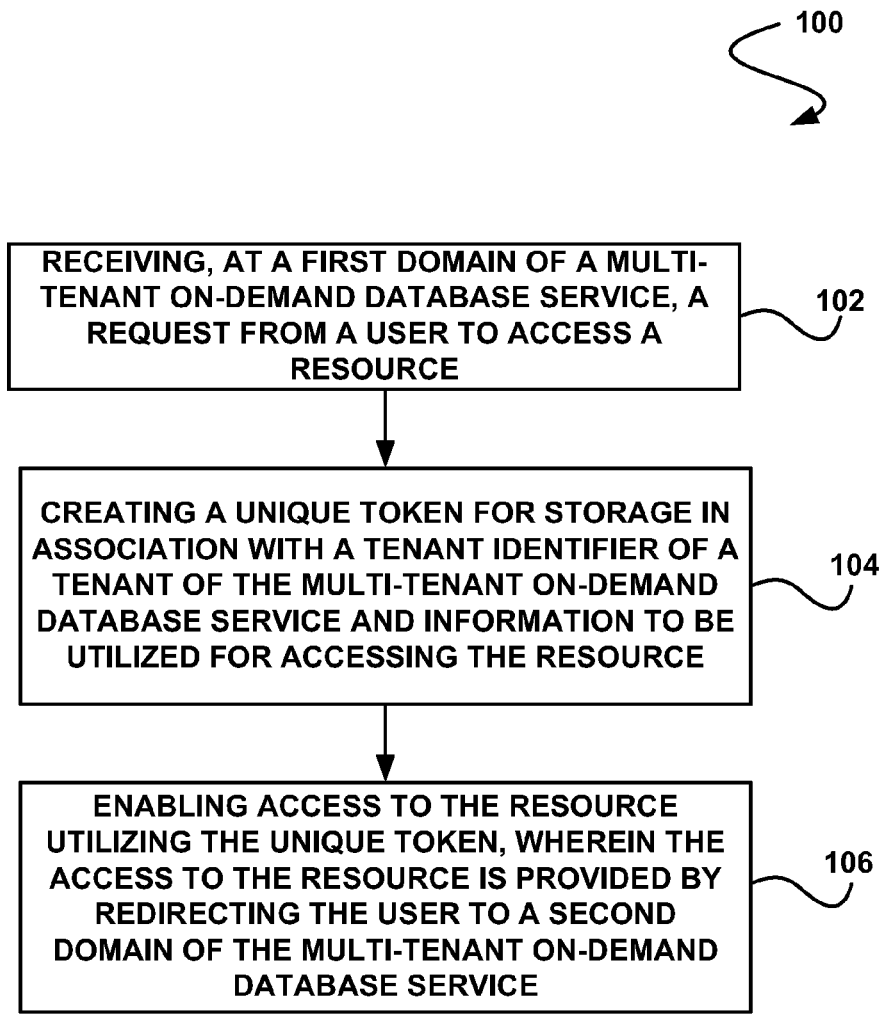
FIG. 1 shows a method for enabling access to a resource of a multi-tenant on-demand database service utilizing a token, in accordance with one embodiment.

FIG. 1 shows a method 100 for enabling access to a resource of a multi-tenant on-demand database service utilizing a token, in accordance with one embodiment. As shown in operation 102, a request to access a resource is received at a first domain of a multi-tenant on-demand database service from a user. In the context of the present description, the multi-tenant on-demand database service may include any service that relies on a database system that is accessible over a network, in which various elements of hardware and software of the database system may be shared by one or more tenants (e.g. customers, organizations, groups, users, etc.). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

To this end, the first domain via which the request to access the resource is received may include a first server of the multi-tenant on-demand database service and/or any other device of the multi-tenant on-demand database service. Additionally, the request to access the resource may be received at the first domain via a network (e.g. the Internet, etc.). For example, a device of the user (e.g. a browser of the device of the user) may transmit the request to access the resource (e.g. via a request message, etc.) to the first server over the network.

It should be noted that the request to access the resource may include any request to download or otherwise receive, view, modify, etc. a resource. In various exemplary embodiments, the resource may include a file, an application (e.g. computer code), data, audio, video, etc. and/or any other type of content that may be made accessible to the user. Optionally, the resource may be authored by the user or by any other user, etc. Thus, for example, the request to access the resource may include a request to download content.

Additionally, a unique token is created for storage in association with a tenant identifier of a tenant of the multi-tenant on-demand database service and information to be utilized for accessing the resource. See operation 104. In one embodiment, the unique token may include a randomly generated identifier. To this end, for example, creating the unique token may include generated a random identifier. Of course, however, the unique token may include any type of token (e.g. value, etc.) that is unique (e.g. that is incapable of being maliciously forged, etc.).

As an option, the unique token may be automatically created. For example, the unique token may be automatically created on-demand in response to the receipt of the request to access the resource by the first domain. By creating unique tokens for use in accessing resources, as described below, in an on-demand manner, resources of the multi-tenant on-demand database service may be prevented from processing overload as a result of creating multiple tokens for resources which are not necessarily being attempted to be accessed.

Further, as noted above, the unique token is created for storage in association with a tenant identifier of a tenant of the multi-tenant on-demand database service and information to be utilized for accessing the resource. In one embodiment, the unique token, the tenant identifier and the information to be utilized for accessing the resource may be stored in a record (e.g. a database record, a record in memory, etc.). Optionally, the record may be stored utilizing the multi-tenant on-demand database service (e.g. in memory of the multi-tenant on-demand database service, etc.).

In another embodiment, the user may be associated with the tenant of the multi-tenant on-demand database service for which the tenant identifier is stored in association with the unique identifier. For example, the tenant may include a customer of the multi-tenant on-demand database service in which the user is a member. Accordingly, the tenant identifier may identify the tenant under which the user is attempting to access the resource.

In yet another embodiment, the information to be utilized for accessing the resource may include any type of information (e.g. data structure, etc.) that is capable of being utilized to access the resource. In various exemplary embodiments, the information may include computer code or a pointer to computer code, such that when executed the computer code provides the user with the access to the resource (e.g. by downloading the resource to the device of the user, etc.). In other exemplary embodiments, the information may include a single value or a structured set of commands capable of being parsed and executed for providing the user with access to the resource.

Of course, it should be noted that the unique token may be stored in association with any other desired information relating to the request to access the resource (e.g. utilizing the record, etc.). Just by way of example, the unique token may further be stored in association with an identifier of the user that requested the access to the resource, a team identifier of a team which the user is a member of, a context in which the user is operating (e.g. a source of the request, such as a webpage), etc.

Further, as shown in operation 106, access to the resource is enabled utilizing the unique token, wherein the access to the resource is provided by redirecting the user to a second domain of the multi-tenant on-demand database service. As noted above, the first domain of the multi-tenant on-demand database service may include a first server of the multi-tenant on-demand database service. Accordingly, in one embodiment, the second domain of the multi-tenant on-demand database service may include a second server of the multi-tenant on-demand database service. In this way, the user may request access to the resource from the first domain and access to the resource may be provided, utilizing the token, by the second domain.

In one embodiment, the access to the resource may be enabled by providing the user with the access to the resource (e.g. by downloading the resource to the device of the user, etc.). As another option, the access to the resource may be enabled utilizing the information to be used for accessing the resource that is stored in association with the unique token. For example, in the embodiment where the information includes computer code or a pointer to the computer code, the access to the resource may be enabled by executing the computer code. Further, the access to the resource may be enabled utilizing the unique token such that access to the resource may only be allowed by virtue of the unique token.

Just by way of example, enabling access to the resource utilizing the unique token may include only allowing the user to access the resource if the unique token is verified. In one embodiment, the unique token may be verified by determining that the unique token is stored (e.g. in association with the tenant identifier and the information to be utilized for accessing the resource). In another embodiment, the unique token may include a time-to-live, such that the unique token may be verified by determining that the unique token as not expired. In yet another embodiment, the unique token may be associated with a one-time use policy (e.g. for security purposes), such that the unique token may be verified by determining that the unique token has not previously been utilized for accessing the resource. To this end, if the unique token is not verified, the access to the resource by the user may be prevented, blocked, etc.

Thus, as described above, a unique token may be created and stored based on a user request to access a resource that is received at a first domain of the multi-tenant on-demand database service. The unique token may be then be utilized for enabling access to the resource, where the access to the resource is provided using the second domain of the multi-tenant on-demand database service. In this way, the second domain may provide the user with the access to the resource without the identity of the user (e.g. the session identifier used by the user, etc.) necessarily being made know to the second domain, such that the identity of the user may be prevented from being intercepted and used by another entity for malicious purposes (e.g. for use in cross-site scripting attacks, cross-site request forgery attacks, etc.).

Figure 2:
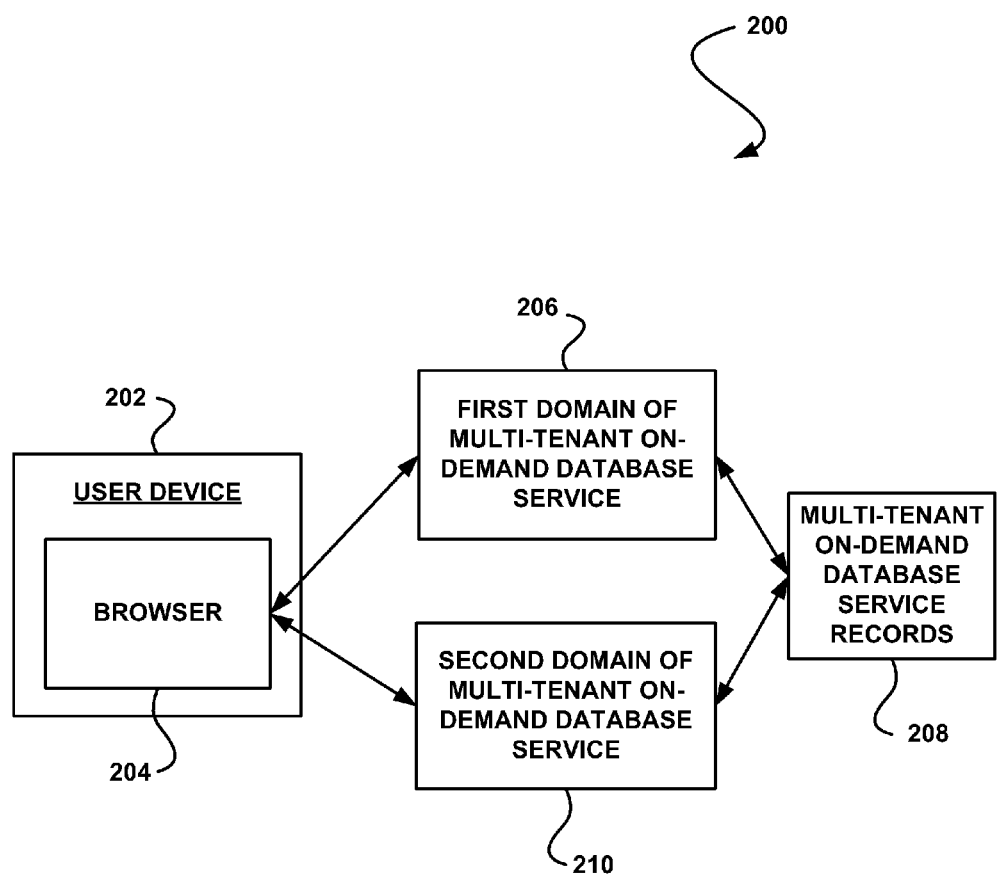
FIG. 2 shows a system for enabling access to a resource of a multi-tenant on-demand database service utilizing a token, in accordance with another embodiment.

FIG. 2 shows a system 200 for enabling access to a resource of a multi-tenant on-demand database service utilizing a token, in accordance with another embodiment. As an option, the present system 200 may be implemented in the context of the functionality of FIG. 1. Of course, however, the system 200 may be implemented in any desired environment. The aforementioned definitions may apply during the present description.

As shown, a user device 202 includes a browser 204 that is in communication with a first domain of a multi-tenant on-demand database service 206 and a second domain of the multi-tenant on-demand database service 210 (e.g. via a network). The browser 204 of the user device 202 may include a web browser, for example. In this way, the user device 202 may utilize the browser 204 for accessing the first domain of the multi-tenant on-demand database service 206 and the second domain of the multi-tenant on-demand database service 210.

In use, the browser 204 of the user device 202 sends a request to the first domain of the multi-tenant on-demand database service 206 for accessing a resource. The request may include a request message, for example, indicating the resource to which access is requested, the type of access to the resource that is requested, and an identifier of a tenant of the multi-tenant on-demand database service that is associated with the user using the user device 202. Optionally, the user may be identified based on login credentials used by the user to log into, and thus send the request to, the first domain of the multi-tenant on-demand database service 206.

Upon receipt of the request from the browser 204 of the user device 202, the first domain of the multi-tenant on-demand database service 206 creates a unique token. In one embodiment, the unique token may be created by randomly generating an identifier. Further, the first domain of the multi-tenant on-demand database service 206 stores the unique token in association with the identifier of the tenant and information to be used for accessing the resource. For example, the information may be generated based on the indication in the request of the resource to which access is requested and the type of access to the resource that is requested. As an option, the information to be used for accessing the resource may include computer code [e.g. written in extensible markup language (XML), etc.] capable of being executed to provide to the browser 204 of the user device 202 the requested access to the resource.

As shown, the unique token and associated tenant identifier and information to be used for accessing the resource are stored in one of a plurality of records of the multi-tenant on-demand database service 208. The records of the multi-tenant on-demand database service 208 may be included in a database of the multi-tenant on-demand database service, random access memory of a server of the multi-tenant on-demand database service, a file of the multi-tenant on-demand database service, etc.

Further, the unique token is forwarded from the first domain of the multi-tenant on-demand database service 206 to the browser 204 of the user device 202, and the browser 204 is redirected to the second domain of the multi-tenant on-demand database service 210. For example, the browser 204 of the user device 202 may be instructed by the first domain of the multi-tenant on-demand database service 206 to transmit the unique token to the second domain of the multi-tenant on-demand database service 210. Optionally, the first domain of the multi-tenant on-demand database service 206 may indicate a uniform resource locator (URL) of the second domain of the multi-tenant on-demand database service 210 to which the unique token is to be transmitted.

Accordingly, the browser 204 of the user device 202 transmits the unique token to the second domain of the multi-tenant on-demand database service 210 for accessing the resource. Upon receipt of the unique token, the second domain of the multi-tenant on-demand database service 210 verifies the unique token for determining whether to enable access to the resource by the browser 204 of the user device 202.

In one embodiment, the second domain of the multi-tenant on-demand database service 210 may verify the unique token by performing a look-up of the unique token in the multi-tenant on-demand database service records 208. For example, if the unique token is found in the multi-tenant on-demand database service records 208, the access to the resource may be enabled by the second domain of the multi-tenant on-demand database service 210. In another embodiment, the second domain of the multi-tenant on-demand database service 210 may verify the unique token by determining whether the unique token as expired (e.g. based on a time-to-live configured for the unique token). For example, if the unique token as not expired, the access to the resource may be enabled by the second domain of the multi-tenant on-demand database service 210.

In yet another embodiment, the second domain of the multi-tenant on-demand database service 210 may verify the unique token by determining whether the unique token has previously been used to access the resource, if the unique token is associated with a one-time use policy. Thus, if it is determined that the unique token has not previously been used to access the resource, the access to the resource may be enabled by the second domain of the multi-tenant on-demand database service 210. It should be noted that in other embodiments, the unique token may be associated with a policy that allows a plurality (e.g. predefined number or unlimited number) of uses thereof.

Of course, it should be noted that the verification of the unique token may include any combination of the above embodiments. Just by way of example, the access to the resource may be enabled by the second domain of the multi-tenant on-demand database service 210 only if the unique token is stored in the multi-tenant on-demand database service records 208, the time-to-live for the unique token has not expired, and the one-time use of the unique token has not previously been consumed by a prior access to the resource utilizing the unique token.

If verification of the unique token by the second domain of the multi-tenant on-demand database service 210 fails (e.g. if the unique token is not stored in the multi-tenant on-demand database service records 208, the time-to-live for the unique token has expired, the one-time use of the unique token has previously been consumed by a prior access to the resource utilizing the unique token, etc.), the second domain of the multi-tenant on-demand database service 210 prevents the browser 204 of the user device 202, and thus the user of the user device 202, from accessing the resource. Optionally, the second domain of the multi-tenant on-demand database service 210 may send an error message to the browser 204 of the user device 202 indicating that access to the resource is denied.

If, however, the unique token is verified by the second domain of the multi-tenant on-demand database service 210, the second domain of the multi-tenant on-demand database service 210 enables the browser 204 of the user device 202 to access the resource. Thus, access to the resource may be provided to a user of the user device 202 in response to the verification of the unique token. In one embodiment, the second domain of the multi-tenant on-demand database service 210 may use the information to be used for accessing the resource that is stored in the multi-tenant on-demand database service records 208 for enabling (e.g. providing) the access to the resource. For example, the second domain of the multi-tenant on-demand database service 210 may use the unique token to look-up such information, such that the information may be parsed and used to perform an action (e.g. execute computer code indicated by the information, etc.) providing the browser 204 of the user device 202 with the resource. In one embodiment, the second domain of the multi-tenant on-demand database service 210 performs the action (providing the browser 204 of the user device 202 with the resource) in the context of the user device 202.

Figure 3:
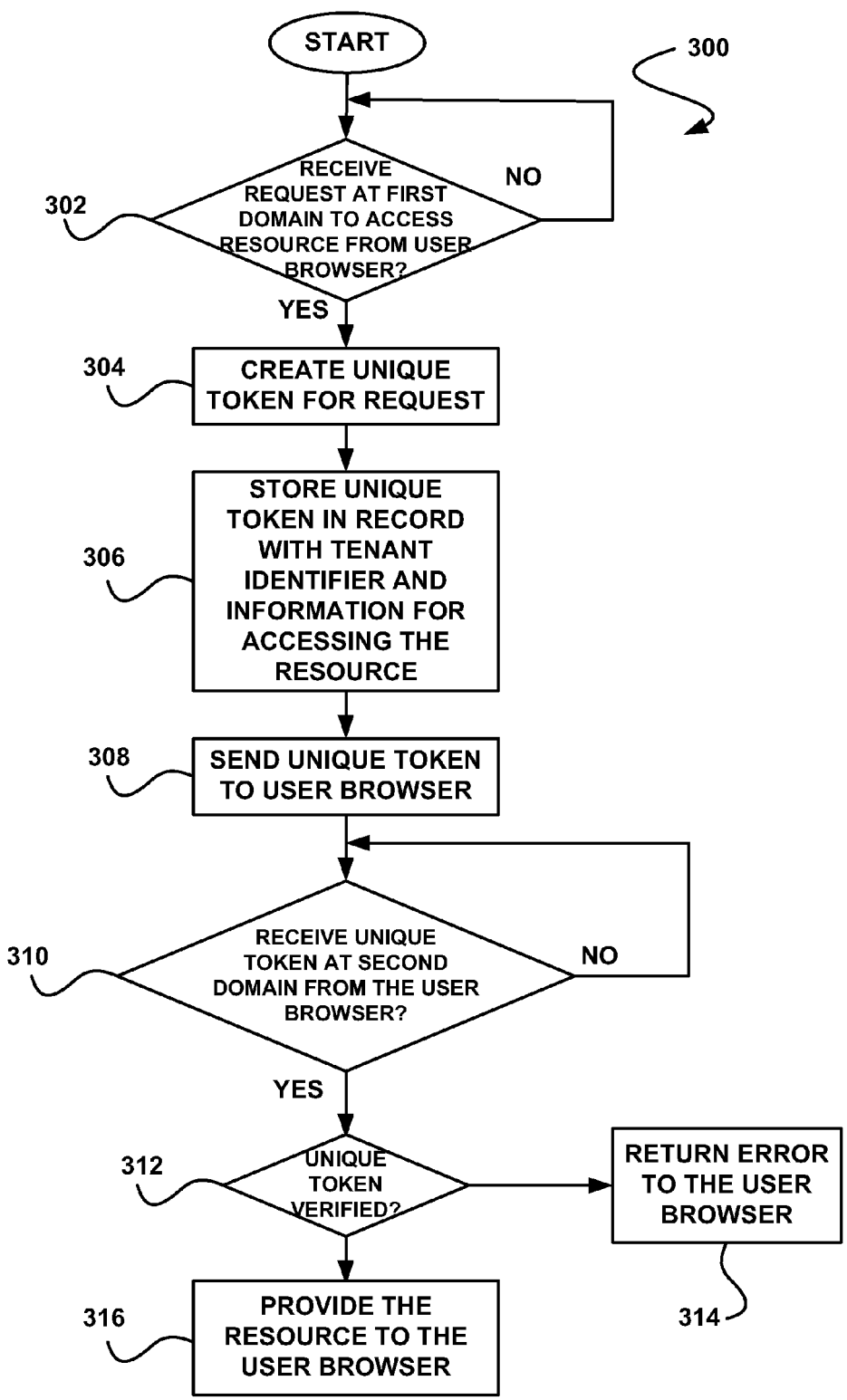
FIG. 3 shows a method for enabling access to a resource of a multi-tenant on-demand database service utilizing a token, in accordance with yet another embodiment.

FIG. 3 shows a method 300 for enabling access to a resource of a multi-tenant on-demand database service utilizing a token, in accordance with yet another embodiment. As an option, the method 300 may be carried out in the context of the functionality of FIGS. 1-2. Of course, however, the method 300 may be carried out in any desired environment. Again, the aforementioned definitions may apply during the present description.

As shown in decision 302, it is determined whether a request to access a resource is received at a first domain of a multi-tenant on-demand database service from a user browser. In the context of the present embodiment, the request may include any request to access a resource that is received from a browser of a user communicating with the multi-tenant on-demand database service via a tenant's account with the multi-tenant on-demand database service. Optionally, the determination may include determining whether a message has been received at the first domain of a multi-tenant on-demand database service requesting access to a resource of the multi-tenant on-demand database service.

If it is determined that a request to access a resource is not received at the first domain of the multi-tenant on-demand database service, the method 300 continues to wait for such a request to be received at the first domain of the multi-tenant on-demand database service. If, however, it is determined that a request to access a resource is received at the first domain of the multi-tenant on-demand database service, a unique token for the request is created. See operation 304. In one embodiment, the unique token may be created by the first domain of the multi-tenant on-demand database service.

Further, as shown in operation 306, the unique token is stored in a record with an identifier of the tenant and with information to be used for accessing the resource. For example, the first domain of the multi-tenant on-demand database service may store the unique token, the tenant identifier and the information to be used for accessing the resource in the record.

Additionally, the unique token is sent to the user browser. See operation 308. It is then determined in decision 310 whether the unique token is received at a second domain of the multi-tenant on-demand database service from the user browser. If it is determined that the unique token has not been received at the second domain of the multi-tenant on-demand database service, the method 300 continues to wait for the unique token to be received at the second domain of the multi-tenant on-demand database service.

If, however, it is determined that the unique token has been received at the second domain of the multi-tenant on-demand database service, it is determined whether the unique token can be verified. See decision 312. For example, it may be determined whether the unique token is stored in the record, whether the unique token is expired, etc. If it is determined that the unique token cannot be verified, an error is returned to the user browser, as shown in operation 314. Further, access to the resource may be blocked. If it is determined that the unique token is verified, the resource is provided to the user browser. See operation 316.

Figure 4:
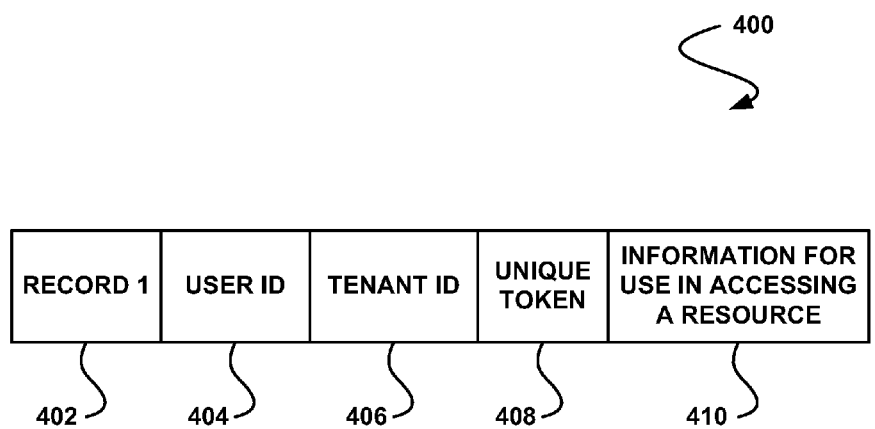
FIG. 4 shows a record for use in enabling access to a resource of a multi-tenant on-demand database service utilizing a token, in accordance with another embodiment.

FIG. 4 shows a record 400 for use in enabling access to a resource of a multi-tenant on-demand database service utilizing a token, in accordance with another embodiment. As an option, the record 400 may be implemented in the context of the functionality of FIGS. 1-2. Of course, however, the record 400 may be implemented in any desired environment. Again, the aforementioned definitions may apply during the present description.

As shown, the record 400 stores a record identifier 402 for uniquely identifying the record. The record 400 also stores a user identifier 404. The user identifier 404 may identify a user that has requested access to a resource.

Further, the record 400 stores a tenant identifier 406. The tenant identifier 406 may identify a tenant of a multi-tenant on-demand database service under which the user is operating. For example, the tenant may have an account with the multi-tenant on-demand database service, and the user may be utilizing such account for requesting the access to the resource.

As also shown, the record 400 stores a unique token 408. The unique token 408 may include a randomly generated identifier that is specific to the requested access to the resource. For example, the unique token 408 may be created in response to the requested access to the resource.

The record 400 further includes information 410 to be used for accessing a resource. As an option, the information 410 may be generated from the request to access the resource. For example, the information 410 may indicate the type of access requested and the resource to which the access is requested. As an option, the information 410 may include computer code or a pointer thereto which when executed provides the user with the access to the resource.

System Overview

Figure 5:
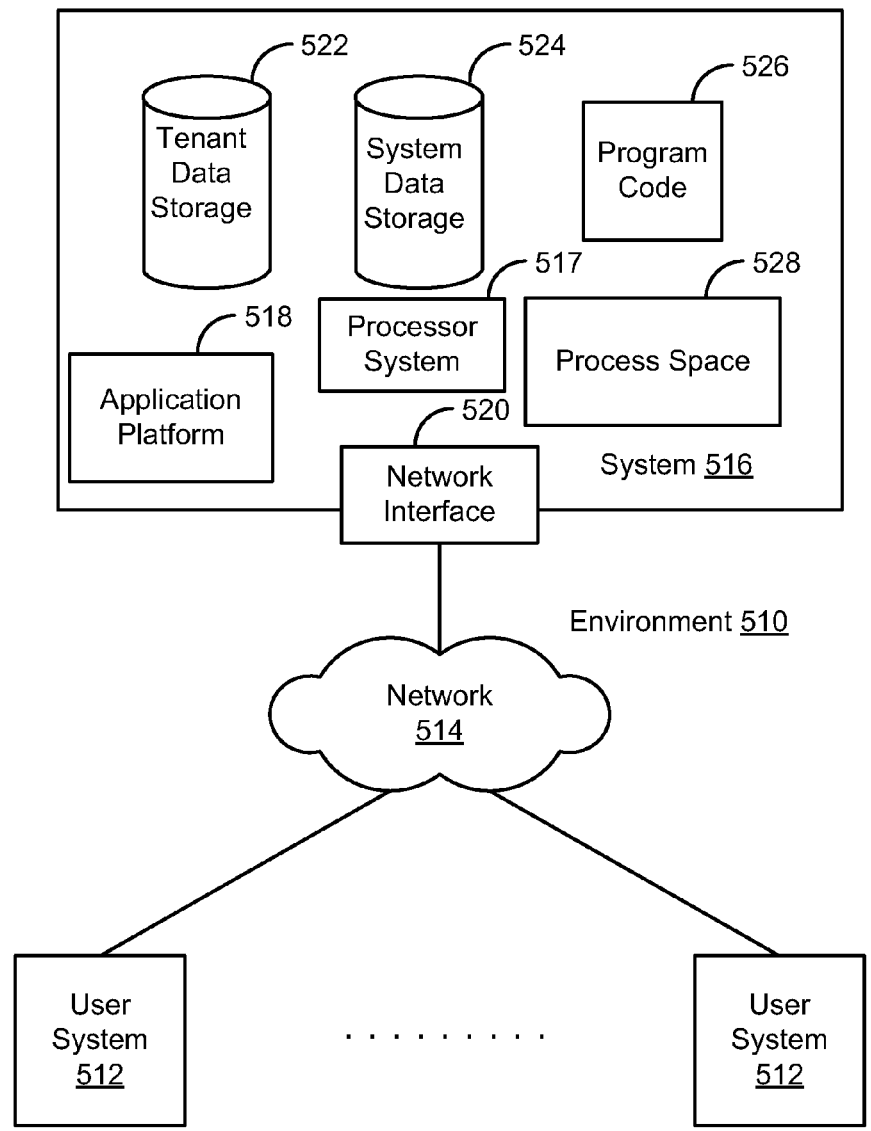
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
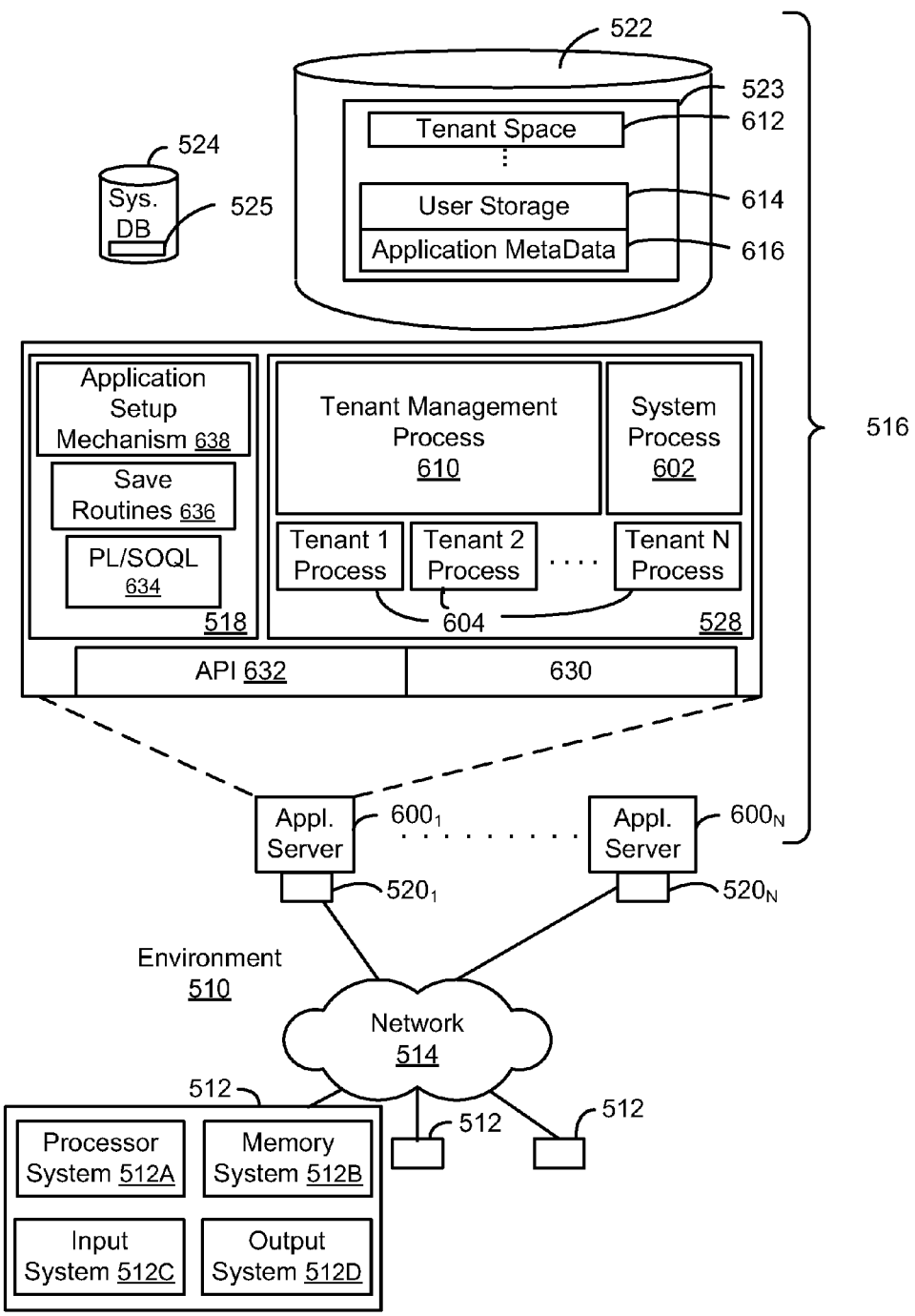
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517 of FIG. 5, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other non-transitory computer readable medium or device as is well known to include only hardware devices, such as a ROM or RAM, or provided on any other hardware device capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of hardware device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; and/or US 2009/0037828 titled "SYSTEM, METHOD AND COMPUTER PROGRAM PRODUCT FOR EDITING AN ON-DEMAND DATABASE SERVICE GRAPHICAL USER INTERFACE," filed Jul. 17, 2008, which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving, at a first domain of a multi-tenant on-demand database service, a request from a user to access a resource, wherein the user is a member of a tenant of the multi-tenant on-demand database service;
in response to receipt of the request, creating, at the on-demand database service, a unique token;
storing in a record of multiple records of the multi-tenant on-demand database service the unique token, an identifier of the tenant of which the user is a member, and information to be utilized for accessing the resource, wherein the information indicates computer code executable to perform an action providing the requested access to the resource; and
enabling access to the resource utilizing the unique token stored in the multi-tenant on-demand database service, wherein the access to the resource is provided by redirecting the user to a second domain of the multi-tenant on-demand database service by:
sending the unique token from the first domain of the multi-tenant on-demand database service to a device of the user,
sending a uniform resource locator (URL) of a second domain of the multi-tenant on-demand database service from the first domain of the multi-tenant on-demand database service to the device of the user,
sending from the first domain of the multi-tenant on-demand database service to the device of the user an instruction to transmit the unique token to the second domain of the multi-tenant on-demand database service,
receiving the unique token at the second domain of the multi-tenant on-demand database service from the device of the user, in response to the sending of the unique token, the URL, and the instruction to the device of the user,
in response to receipt of the unique token at the second domain of the multi-tenant on-demand database service from the device of the user, performing a look-up of the unique token in the multiple records of the multi-tenant on-demand database service,
verifying the unique token based on the look-up,
in response to the verification, using the unique token to identify the information to be utilized for accessing the resource in the multi-tenant on-demand database service which indicates the computer code executable to perform the action providing the requested access to the resource,
in response to identification of the information, executing the computer code indicated by the information for providing the user with the requested access to the resource.

2. The method of claim 1, wherein the request to access the resource includes a request to download the resource.

3. The method of claim 2, wherein the computer code, when executed, downloads the resource to the device of the user.

4. The method of claim 1, wherein the unique token is automatically created on-demand in response to the receipt of the request to access the resource.

5. The method of claim 1, wherein the unique token includes a randomly generated identifier.

6. The method of claim 1, wherein the record further stores an identifier of the user.

7. The method of claim 1, wherein the information to be utilized for accessing the resource includes the computer code executable to perform an action providing the user with the requested access to the resource.

8. The method of claim 1, wherein the first domain of the multi-tenant on-demand database service includes a first server of the multi-tenant on-demand database service and the second domain of the multi-tenant on-demand database service includes a second server of the multi-tenant on-demand database service.

9. The method of claim 1, wherein the request from the user is received from a device of the user.

10. The method of claim 1, wherein the verifying the unique token is performed utilizing the second domain of the multi-tenant on-demand database service.

11. The method of claim 10, wherein access to the resource by the user is prevented in response to a failure of the verification of the unique token.

12. The method of claim 1, wherein the unique token includes a time-to-live and is verified by determining that the unique token is stored and that the unique token has not expired.

13. The method of claim 1, wherein the information to be utilized for accessing the resource is generated based on an indication in the request of the resource to which access is requested and a type of access to the resource that is requested, such that the information is capable of being executed for providing the user with the requested access to the resource.

14. The method of claim 1, wherein
the verifying includes determining, based on the look-up, that the unique token is found in the multi-tenant on-demand database service.

15. The method of claim 1, wherein the information indicates the computer code executable to perform the action providing the requested access to the resource by including a pointer to the computer code executable to perform the action providing the requested access to the resource.

16. A computer program product embodied on a non-transitory computer readable medium, comprising:
  computer code for receiving, at a first domain of a multi-tenant on-demand database service, a request from a user to access a resource, wherein the user is a member of a tenant of the multi-tenant on-demand database service;
  computer code for, in response to receipt of the request, creating, at the on-demand database service, a unique token;
  computer code for storing in a record of multiple records of the multi-tenant on-demand database service the unique token, an identifier of the tenant of which the user is a member, and information to be utilized for accessing the resource, wherein the information indicates computer code executable to perform an action providing the requested access to the resource; and
  computer code for enabling access to the resource utilizing the unique token stored in the multi-tenant on-demand database service, wherein the computer program product is operable such that the access to the resource is provided by redirecting the user to a second domain of the multi-tenant on-demand database service by:
    sending the unique token from the first domain of the multi-tenant on-demand database service to a device of the user,
    sending a uniform resource locator (URL) of a second domain of the multi-tenant on-demand database service from the first domain of the multi-tenant on-demand database service to the device of the user,
    sending from the first domain of the multi-tenant on-demand database service to the device of the user an instruction to transmit the unique token to the second domain of the multi-tenant on-demand database service,
    receiving the unique token at the second domain of the multi-tenant on-demand database service from the device of the user, in response to the sending of the unique token, the URL, and the instruction to the device of the user,
    in response to receipt of the unique token at the second domain of the multi-tenant on-demand database service from the device of the user, performing a look-up of the unique token in the multiple records of the multi-tenant on-demand database service,
    verifying the unique token based on the look-up,
    in response to the verification, using the unique token to identify the information to be utilized for accessing the resource in the multi-tenant on-demand database service which indicates the computer code executable to perform the action providing the requested access to the resource,
    in response to identification of the information, executing the computer code indicated by the information for providing the user with the requested access to the resource.

17. An apparatus, comprising:
  a first domain including a first server of a multi-tenant on-demand database service for:
  receiving a request from a user to access a resource, wherein the user is a member of a tenant of the multi-tenant on-demand database service;
  in response to receipt of the request, creating, at the on-demand database service, a unique token; and
  storing in a record of multiple records of the multi-tenant on-demand database service the unique token, an identifier of the tenant of which the user is a member, and information to be utilized for accessing the resource, wherein the information indicates computer code executable to perform an action providing the nested access to the resource; and
  a second domain including a second server of the multi-tenant on-demand database service for enabling access to the resource utilizing the unique token stored in the multi-tenant on-demand database service;
  wherein the access to the resource is provided by redirecting the user to the second domain of the multi-tenant on-demand database service by:
    sending the unique token from the first domain of the multi-tenant on-demand database service to a device of the user,
    sending a uniform resource locator (URL) of a second domain of the multi-tenant on-demand database service from the first domain of the multi-tenant on-demand database service to the device of the user,
    sending from the first domain of the multi-tenant on-demand database service to the device of the user an instruction to transmit the unique token to the second domain of the multi-tenant on-demand database service,
    receiving the unique token at the second domain of the multi-tenant on-demand database service from the device of the user, in response to the sending of the unique token, the URL, and the instruction to the device of the user,
    in response to receipt of the unique token at the second domain of the multi-tenant on-demand database service from the device of the user, performing a look-up of the unique token in the multiple records of the multi-tenant on-demand database service,
    verifying the unique token based on the look-up,
    in response to the verification, using the unique token to identify the information to be utilized for accessing the resource in the multi-tenant on-demand database service which indicates the computer code executable to perform the action providing the requested access to the resource,
    in response to identification of the information, executing the computer code indicated by the information for providing the user with the requested access to the resource.

* * * * *

UNITED STATES PATENT AND TRADEMARK OFFICE
CERTIFICATE OF CORRECTION

| | | |
|---|---|---|
| PATENT NO. | : 8,417,723 B1 | Page 1 of 1 |
| APPLICATION NO. | : 12/557413 | |
| DATED | : April 9, 2013 | |
| INVENTOR(S) | : Lissack et al. | |

It is certified that error appears in the above-identified patent and that said Letters Patent is hereby corrected as shown below:

In the claims:
Claim 17, col. 18, line 20; please replace "nested" with --requested--.

Signed and Sealed this
Twenty-fifth Day of November, 2014

Michelle K. Lee
*Deputy Director of the United States Patent and Trademark Office*